US005871792A

United States Patent [19]
Weiss et al.

[11] Patent Number: 5,871,792
[45] Date of Patent: Feb. 16, 1999

[54] METHOD FOR POPPING POPCORN

[75] Inventors: Ronald R. Weiss, Okeana; Lee Kindley Hodgson, Cincinnati, both of Ohio

[73] Assignee: Gold Medal Products, Inc., Cincinnati, Ohio

[21] Appl. No.: 910,756

[22] Filed: Aug. 13, 1997

Related U.S. Application Data

[60] Division of Ser. No. 633,580, Apr. 17, 1996, Pat. No. 5,743,172, which is a continuation-in-part of Ser. No. 345,303, Dec. 28, 1994, Pat. No. 5,694,830.

[51] Int. Cl.⁶ ...................................................... A23L 1/00
[52] U.S. Cl. ........................................... 426/233; 426/523
[58] Field of Search ..................................... 426/231, 233, 426/523; 99/323.5, 323.7

[56] References Cited

U.S. PATENT DOCUMENTS

| | | |
|---|---|---|
| 1,219,341 | 3/1917 | Truitt . |
| 1,477,704 | 12/1923 | Holcomb et al. . |
| 1,545,357 | 7/1925 | Schwimmer . |
| 1,704,133 | 3/1929 | LeClaire . |
| 1,789,902 | 1/1931 | Jackson . |
| 1,977,831 | 10/1934 | Marshall et al. . |
| 2,017,293 | 10/1935 | Priest . |
| 2,027,698 | 1/1936 | Parks et al. . |
| 2,034,484 | 3/1936 | Pagendarm . |
| 2,123,663 | 7/1938 | Roach . |
| 2,134,682 | 11/1938 | Burch . |
| 2,230,460 | 2/1941 | Kleinwachter . |
| 2,232,954 | 2/1941 | Manley . |
| 2,248,812 | 7/1941 | Cretors . |
| 2,254,271 | 9/1941 | Cretors . |
| 2,458,190 | 1/1949 | Newburger . |
| 2,529,877 | 11/1950 | Ladge . |
| 2,536,298 | 1/1951 | Manley . |
| 2,575,643 | 11/1951 | Tamsen . |
| 2,646,189 | 7/1953 | Wickesberg . |
| 2,729,953 | 6/1956 | Cretors . |
| 2,812,704 | 11/1957 | Hawks . |
| 2,856,841 | 10/1958 | Cretors et al. . |
| 2,859,015 | 11/1958 | Spangler . |
| 2,939,379 | 6/1960 | Schmitt . |
| 2,972,292 | 2/1961 | Waas et al. . |
| 2,984,169 | 5/1961 | Bushway . |
| 3,102,032 | 8/1963 | Lippert . |
| 3,120,168 | 2/1964 | Lippert . |
| 3,197,076 | 7/1965 | Chamblee . |
| 3,223,291 | 12/1965 | Thomas . |
| 3,253,532 | 5/1966 | Jones . |
| 3,253,747 | 5/1966 | Thomas . |
| 3,254,800 | 6/1966 | Baunach . |
| 3,282,470 | 11/1966 | Thomas . |
| 3,294,546 | 12/1966 | Fingerhut . |
| 3,321,107 | 5/1967 | Govin et al. . |
| 3,554,115 | 1/1971 | Manley et al. . |

(List continued on next page.)

FOREIGN PATENT DOCUMENTS

| | | |
|---|---|---|
| 682731 | 3/1964 | Canada . |
| 364-071 | 7/1989 | European Pat. Off. . |

*Primary Examiner*—George Yeung
*Attorney, Agent, or Firm*—Wood, Herron & Evans, LLP

[57] ABSTRACT

Apparatus and methods for popping popcorn comprise a heated kettle which is controlled and monitored according to the temperature of the kettle. The kettle is initially heated to a start cook temperature and a buzzer and light alert an operator to add uncooked popcorn and oil to the kettle which lowers the temperature of the kettle below a predetermined start temperature and initiates a cooking cycle. An oil pump system is enabled at the initiation of the cooking cycle for adding oil to the kettle. As the popcorn and oil cook, the kettle temperature increases and passes through a predetermined dump temperature and the kettle automatically tilts and dumps the cooked popcorn. After the dump, the kettle temperature increases to the start cook temperature again and the buzzer and light are activated to alert the operator to add another batch of ingredients for consecutive batches of popcorn.

17 Claims, 7 Drawing Sheets

U.S. PATENT DOCUMENTS

| | | |
|---|---|---|
| 3,641,916 | 2/1972 | McDevitt et al. . |
| 3,645,422 | 2/1972 | Cretors . |
| 3,697,289 | 10/1972 | Day et al. . |
| 3,783,820 | 1/1974 | Hautly et al. . |
| 3,812,774 | 5/1974 | Day et al. . |
| 3,930,966 | 1/1976 | Takahashi et al. . |
| 4,094,446 | 6/1978 | Brutsman . |
| 4,120,236 | 10/1978 | Blomberg . |
| 4,133,456 | 1/1979 | Corini . |
| 4,171,066 | 10/1979 | Hirose . |
| 4,171,667 | 10/1979 | Miller et al. . |
| 4,178,843 | 12/1979 | Crabtree et al. . |
| 4,182,229 | 1/1980 | Van de Walker . |
| 4,206,695 | 6/1980 | Cretors . |
| 4,372,354 | 2/1983 | Moore . |
| 4,421,146 | 12/1983 | Bond et al. . |
| 4,426,923 | 1/1984 | Ohata . |
| 4,477,003 | 10/1984 | Baker et al. . |
| 4,484,697 | 11/1984 | Fry, Jr. . |
| 4,557,399 | 12/1985 | Redick, Jr. . |
| 4,584,586 | 4/1986 | Manley et al. . |
| 4,632,275 | 12/1986 | Parks . |
| 4,723,688 | 2/1988 | Munoz . |
| 4,727,798 | 3/1988 | Nakamura . |
| 4,763,568 | 8/1988 | Kiczek . |
| 4,850,120 | 7/1989 | Stein . |
| 4,919,308 | 4/1990 | Majkrzak . |
| 5,026,969 | 6/1991 | Knepler et al. . |
| 5,033,363 | 7/1991 | King et al. . |
| 5,035,173 | 7/1991 | Stein et al. . |
| 5,114,045 | 5/1992 | Herpe . |
| 5,212,857 | 5/1993 | Hutchinson . |
| 5,301,601 | 4/1994 | Cretors . |
| 5,555,792 | 9/1996 | Stein et al. . |
| 5,590,582 | 1/1997 | Weiss . |

METHOD FOR POPPING POPCORN

CROSS REFERENCE TO RELATED APPLICATIONS

This application is a divisional of application Ser. No. 08/633,580, entitled "Automatic Popcorn Popper With Thermal Controller," filed Apr. 17, 1996; now U.S. Pat. No. 5,743,172, which is, in turn, a continuation-in-part of application Ser. No. 08/345,303 entitled "Automated Corn Popper" and filed Nov. 28, 1994; now U.S. Pat. No. 5,694,830, which applications are incorporated herein by reference in their entirety.

FIELD OF THE INVENTION

This invention relates generally to popcorn poppers and more specifically to an automatic popcorn popper which produces popcorn in consecutive batches while reducing the amount of attention required from an operator. This invention also relates to an improved method for popping popcorn.

BACKGROUND OF THE INVENTION

Popcorn is mass-produced for sale at movies and other events in commercial popcorn poppers which include an enclosed, transparent cabinet containing a tiltable kettle suspended above a catch area or platform. The kettle is heated and uncooked popcorn kernels are placed therein to be cooked and popped. Once the kernels are popped, the kettle is manually tilted and the popcorn spills onto the platform to be scooped up, packaged and sold to customers.

Conventionally, commercial popcorn poppers have been manually operated and have required an operator's constant attention for cooking the kernels and subsequently dumping the popped popcorn. For example, an operator would load the kettle with popping oil and unpopped corn kernels and then listen and watch for the unpopped corn to pop. When the operator decided, somewhat arbitrarily, that the corn was sufficiently popped, they would then dump the kettle and spill the popcorn onto the serving platform. Additional oil and corn would then be added for the next batch. While such conventional popcorn poppers are generally effective in mass-producing popcorn; the constant attention they require prevents the operator from other important tasks, such as selling the popcorn and other concession products, taking money and generally servicing customers.

As may be appreciated, the multiple duties entrusted concessionaire operators are not conducive to having them constantly monitor a popcorn popper. If attention is diverted for an extended length of time, the popcorn is susceptible to being burned or overcooked. In addition to the waste of burned popcorn, the aroma of the burned popcorn is not attractive to customers and may actually discourage purchases. Furthermore, if the operator inadvertently dumps the burned corn onto the platform, it will contaminate the usable popcorn which has already been produced and may render the entire batch inedible and thus unusable. Still further, the results and mess from burned popcorn is not easy to clean. The kettle is hot and must be allowed to cool before the burned popcorn is removed and the kettle placed back in service.

Additionally, the arbitrary nature of the dumping process with conventional poppers makes them subject to messes associated with premature dumping. For example, if the operator mistakenly believes that the corn has been completely popped and the oil used when indeed uncooked corn and oil remains in the kettle, tilting the kettle will spill oil onto the serving platform and possibly onto the counter. Such spills ruin and waste popcorn and create a mess which must be cleaned, adding to the already numerous tasks of a concessionaire.

Still further, too much oil may be added for a particular cooking cycle, and even if the cooking cycle is completed, excess oil might be left, again resulting in a mess upon dumping of the batch. For example, one operator may load the uncooked corn and oil for a batch, and another operator may subsequently and inadvertently load more oil, believing it had not been added. The excess oil does not burn off or cook and remains in the kettle. Not only is a mess created upon dumping, but the excess oil may also foul the batch of popcorn.

Another drawback of conventional popcorn poppers is the inherent delays which will occur between cooked batches of popcorn. When the popcorn has been cooked and dumped, the operator may begin serving it to customers without replenishing the supply of corn and oil and starting the next batch. Therefore, the next batch of popcorn will not be produced until the operator consciously sets aside time from his other activities to do so. Such delays interrupt production rates and introduce inefficiencies into the operation which reduce popcorn sales.

It is also desirable to pop popcorn consistently so that it produces consistent taste from batch to batch. The vagaries of prior systems leave much to chance in this regard so that batches of corn are undercooked, burned or the like and at the least are inconsistent in taste.

Still another drawback to conventional popping mechanisms is that they sometimes provide inconsistent or improper heating of the popcorn so that proper expansion of the kernels upon popping is not achieved. Particularly, when the heat is too high, the steam from the kernel is prematurely forced out and the popped kernel is small. If the temperature is too low, the kernels do not experience proper hull expansion and brittleness at popping and the popped kernels are small. As may be appreciated, small popcorn kernels reduce the yield of popped popcorn per unit of uncooked kernels, thus reducing the efficiently of the popping apparatus and raising the cost of the operation.

As a result, it is one objective of the present invention to provide improved apparatus and/or methods to pop popcorn continuously in consecutive batches with minimal attention by an operator.

It is another objective to ensure that the popcorn is consistently and properly cooked in each batch.

It is a further objective of the present invention to reduce the burning of popcorn sometimes associated with conventional machines and operator inattention.

It is also an objective of the invention to always provide the proper amount of cooking oil and thus reduce the messes associated with such burned popcorn or spilled, uncooked oil and thereby allow an operator to focus upon customers and popcorn sales.

It is a still further objective of the invention to reduce the delays between fresh batches of popcorn attributable to lack of attention by the operator.

It is a still further objective of the invention to increase the production rate of consecutive batches of fresh popcorn to thereby increase the sales from and the profitability of a commercial popcorn popper.

Still further, it is an objective to provide the proper and consistent temperature to the kernels as they cook to ensure proper popping conditions and to maximize the popcorn yield per unit of kernels.

SUMMARY OF THE INVENTION

Addressing these objectives, the present invention comprises a popcorn popper which may be left unattended to automatically cook and dump popcorn once it has been loaded with the proper ingredients, such as uncooked popcorn. The proper, premeasured amount of oil pump is then added by the oil pump system upon the initiation of a cooking cycle so that the operator does not have to worry about measuring oil or excess oil in the kettle. The popcorn popper of the invention is responsive to kettle temperature conditions to automatically cook popcorn kernels, subsequently dump the finished popcorn, and then alert the operator to load more ingredients such as oil and uncooked kernels, and start the next batch. In that way, all of the batches of fresh popcorn are properly cooked at regular periods with the proper amount of oil and heat, and the operator is left to attend to other tasks.

According to the invention, popcorn is consistently cooked by introducing an amount of popcorn and oil to a cooking system, comprising a heated kettle, for a duration sufficient to heat the corn and oil a predetermined amount, and then automatically dumping popped popcorn after a sufficient amount of heat energy has been absorbed by the corn and the oil to pop the corn. The application of heat energy to the corn and oil is not monitored and controlled by time, but rather by the heat conditions of the cooking system for each batch. In this regard, a kettle is heated to a start temperature and cycled about that temperature through a small temperature range. When unpopped corn and oil are introduced, a thermocouple on the kettle senses a temperature drop (cycle point) and a cooking or popping cycle begins. The corn and oil absorb the heat energy and are heated in the kettle until the kettle temperature climbs back to a predetermined temperature (dump point) indicating sufficient heat energy has been applied to the corn and oil to pop the corn. At that point, the kettle is automatically dumped.

Since the controller is temperature, rather then time responsive, the operator is assured a consistent amount of heat is always applied to the corn and oil for consistent popping. If the kettle dump was controlled by time alone, and the environment changed, such as a cabinet door being open, the cooking cycle might time out before sufficient heat energy was applied to consistently cook that batch of corn. Moreover, since the start temperature is held within a narrow predetermined range, the oil and corn will not be prematurely burned and the temperature gradients applied thereto will be more consistent. Also, such a method accommodates at least some variations in the amount of corn and oil introduced to the kettle. If too little, the temperature drop will not be as great and the rise to the predetermined dump temperatures takes a shorter time, thus sufficient but less heat is introduced so this batch is consistently popped. In a corresponding manner, larger amounts of corn and oil will slow the climb of temperature to the dump point insuring that sufficient heat is imparted to pop the corn consistently with other batches.

To further ensure proper cooking by the invention, a premeasured amount of oil is introduced to the kettle at the beginning of a cooking cycle. The controller is coupled to an oil pump system which is operably in fluid communication with the kettle. Upon the kettle reaching the proper start temperature or cooking temperature, the oil pump system and an oil pump switch are enabled. The operator then actuates the oil pump switch to activate the pump system and deliver a proper, premeasured amount of oil to the kettle. The oil pump system and switch are disabled by the controller if the kettle heat is not ON (no cooking cycle) or the kettle is tilted from an upright position, such as to be cleaned. Furthermore, in accordance with the principles of the present invention, the oil pump system will only deliver one load of oil per cooking cycle to prevent an oil overload or spilling of oil when the cooked batch of popcorn is dumped. Therefore, the oil pump switch may be actuated numerous times and only one load of oil will be delivered per cooking cycle.

In an alternative embodiment of the invention, the controller is operable to activate the oil pump system automatically upon the initiation of a cooking cycle. To that end, the controller provides an output signal to the oil pump system to pump a premeasured amount of oil to the kettle at a predetermined time in the cooking cycle. For example, the oil might be added when the kettle has risen to a start temperature or might be added after the popcorn has been added. If the oil pump system has a mechanically adjusted timer mechanism for pumping a premeasured amount, an output signal is provided by the controller to activate the pump and pump oil into the kettle. If the oil pump system includes a programmable timer mechanism, the controller is operable to provide additional timer outputs to adjust the amount of time that the pump will deliver oil when activated. In either case, a premeasured and proper amount of oil is delivered to the kettle each cooking cycle. The controller will not activate the pump system until the kettle is hot and ready to cook and is upright.

More specifically, the popper apparatus includes a kettle which is coupled to a dumping motor and a heater which are controlled by a controller which monitors the kettle temperature. The controller includes a temperature sensor, such as a thermocouple, which is operably connected to the kettle proximate the heaters. By monitoring the temperature of the kettle, the controller is operable to dump the kettle at the proper time and to alert the operator when another batch of uncooked corn kernels should be added to the kettle. Since the kettle temperature is constantly monitored, and the dump cycle is automatically controlled, the burning of popcorn is prevented. Furthermore, an operator does not have to constantly monitor the procedure to prevent such burning and can thus turn his attention to other tasks. The popper begins a cooking or popping cycle when fresh ingredients are added, and by alerting the operator at the end of each popping cycle, the popper effectively reduces the delay between batches to increase its productivity.

In a preferred embodiment of the invention, a programmable logic controller (PLC) is coupled to a temperature controller which, in turn, is coupled to a kettle thermocouple and to kettle heaters. When the popper is turned ON and the kettle heat is turned ON, the kettle is heated to an equilibrium start or cooking temperature of, for example, approximately 525° F. The thermocouple and temperature controller preferably maintain the desired 525° F. kettle cooking temperature in a small cycled range of +/−10° F. When the kettle has reached the equilibrium start temperature, the PLC activates indicators which provide visual and audible indications that the kettle is ready to make popcorn. The oil pump system and pump switch are enabled and the operator actuates the oil pump switch to load the oil which is pumped in by the oil pump, and also loads the uncooked popcorn kernels.

Alternatively, the oil might be loaded by hand by the operator. In still another alternative embodiment of the invention, as discussed above, the PLC provides outputs directly to the oil pump system to automatically pump oil to the kettle at the initiation of a cooking cycle. The PLC is operably coupled to the oil pump system to activate the pump for a predetermined amount of time to ensure a premeasured amount of oil. A timer determines how long the pump runs once activated to ensure the proper amount of oil. The invention may incorporate an oil pump system having a mechanically adjusted timer, such as a dial timer, or may incorporate a system having a separate programmable timer. In the latter case, the PLC is operable to provide separate output signals to the programmable timer to set the pump time in addition to any output signals to the pump for delivering oil for the amount of time set by the timer.

The temperature controller senses the rapid drop in kettle temperature associated with the absorption of heat from the kettle by the corn and oil. When the temperature drop exceeds a set amount, for example, 50° F. below the equilibrium start temperature, the PLC initiates a cooking cycle. The point of initiation of the cooking cycle is designated the cycle temperature or cycle point.

As the cooking cycle progresses, the PLC senses through the temperature controller, that the kettle has dropped to a minimum temperature below the cycle temperature. The minimum temperature will depend upon the heat load added to the kettle. As the popcorn pops, the temperature of the kettle begins to rise above the minimum temperature. When the kettle temperature reaches a predetermined dump temperature or dump point and the PLC that the minimum temperature was previously reached and was preceded by the cycle temperature, the popper indicates that the end of the cooking cycle has occurred. Preferably, the predetermined kettle dump temperature associated with the dump point for determining the end of a cooking cycle is equal to the cycle temperature associated with the start of the cooking cycle, i.e., approximately 50° F. below the equilibrium start temperature, for example. Upon sensing the end of the cooking cycle at the dump point, the PLC initiates a dump cycle and controllably energizes the dump motors to tilt the kettle and dump the finished popcorn onto the surface platform. The popcorn is immediately and automatically dumped at the end of a proper cooking cycle, therefore preventing the popcorn from burning. Furthermore, because of the unique temperature-driven control of the popper, the popcorn is consistently and properly cooked and may be served at the peak of freshness. The greater the amount of corn and oil added, the longer the cooking cycle. Conversely, the less the amount of corn and oil, the shorter the cooking cycle.

Preferably, the motors are controlled to dump the kettle twice to ensure complete dumping. After the first dump, the kettle is only partially returned to a cooking or popping position. It is then dumped again before fully returning to a popping position.

When the temperature controller indicates that the kettle temperature is below the cooking cycle point and the machine is in a cooking cycle, the PLC disables the dump motors and thus prevents inadvertent dumping of the kettle contents;

When the popcorn has been dumped at the end of a cooking cycle, the kettle will heat back up to the start cook point again, and audible and visual indications are again initiated to remind a busy operator to reload the kettle with fresh ingredients. This prevents delays in between consecutive batches of popcorn and thus increases the efficiency of the operator and the popcorn popper, increasing production rates and profitability.

The present invention provides the proper application of heat energy consistently to batches of corn kernels. In that way, the kernels are heated to a sufficient temperature to provide proper hull brittleness and expansion when the kernels pop but the heat is not so high so as to force out the steam in the kernel prematurely. Therefore, the invention achieves the desired corn temperature and peak steam pressure for proper expansion. Expansion rates of approximately 1:50 have been achieved with the invention which is a significant improvement over some conventional devices which achieve expansion rates of 1:44 or lower.

Therefore, the present invention automates the cooking and dumping of popcorn and eliminates the need for constant operator attention to the process. Production of consistently popped corn is increased as is the profitability of the operation while incidents of burned corn and inadvertently spilled oil or uncooked corn are eliminated. Furthermore, the temperature control of the kettle operation and the cooking cycle provides properly and consistently cooked batches of popcorn.

The above and other objectives and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
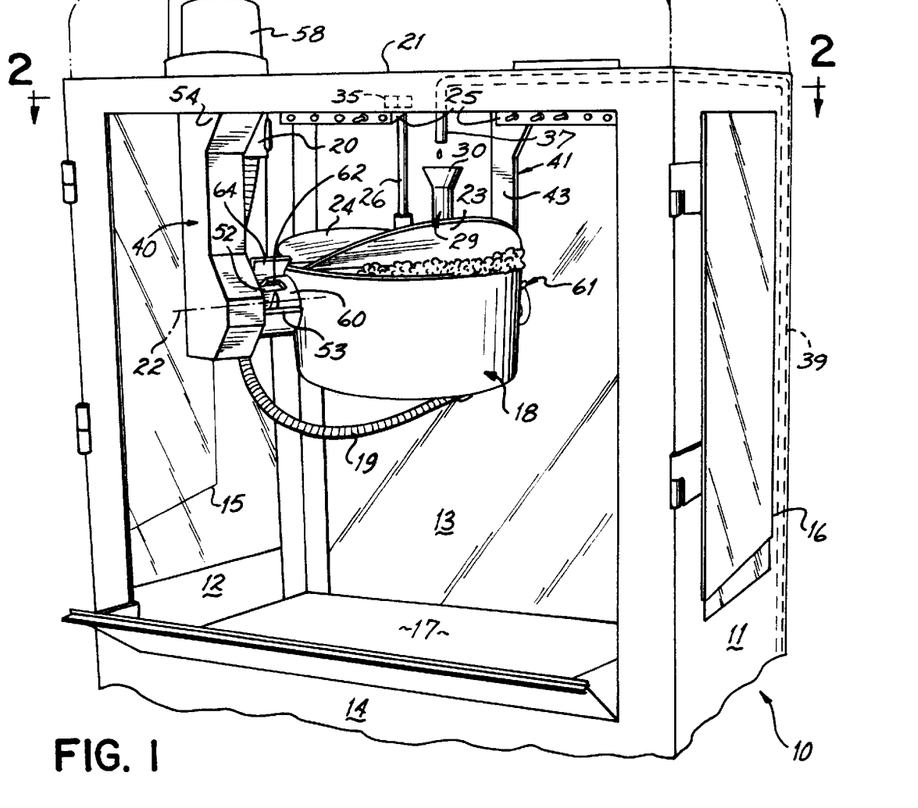
FIG. 1 is a perspective view of a popcorn popper apparatus in accordance with the principles of the invention.

Turning now to the drawings, there is shown in FIG. 1 an automated corn popper 10 according to the invention. It will be appreciated that the popper is operable to cook or to pop popcorn and is particularly useful for cooking consecutive batches of popcorn for sale for use by concessionaires at movie theaters, sport events, fairs and the like.

The corn popper 10 includes a cabinet having transparent walls including two sidewalls 11, 12, a rear wall 13, front wall 14, and a service platform 17 for catching popcorn. Front wall 14 includes two doors 15, 16, which can be opened to gain access, both to the popped corn on the platform 17 of the cabinet and to the kettle 18. Sidewalls 11, 12 and rear wall 13, as well as the front wall 14 including doors 15, 16, are all made preferably of transparent glass or plastic material so that the interior of the cabinet can be viewed from the exterior. The cabinet may also include various operating switches and light indicators on an operating panel 25 for turning ON kettle heat, the dump motor, a warmer (not shown) under platform 17 and lights inside the cabinet as well as turning ON the heaters and pumps of an oil pump system (see in FIG. 1B) for providing cooking oil for the operation. The lights may indicate that one or more of these systems are ON. Various of these systems will now be described in greater detail in accordance with the principles of the present invention.

The cabinet of popper 10 also preferably includes an oil pump system 36 which would rest below the platform in the cabinet (see FIG. 1B). The oil pump system 36 provides oil to the kettle during a cooking cycle and might be one of various different systems. For example, Gold Medal Products Co. of Cincinnati, Ohio, which is the owner/assignee of the present patent application, markets the Model 2114 Accumeter Bucket Pump for pumping popcorn oil. Another system, Model 2257 Rack Oil Delivery System, is also available from Gold Medal Products and is discussed in U.S. patent application Ser. No. 08/541,469 entitled "Oil Supply for Popcorn Poppers", which application is incorporated herein by reference in its entirety. While those oil systems manufactured by Gold Medal Products Co. are preferable, the present invention might be utilized with other systems as well.

Figure 2:
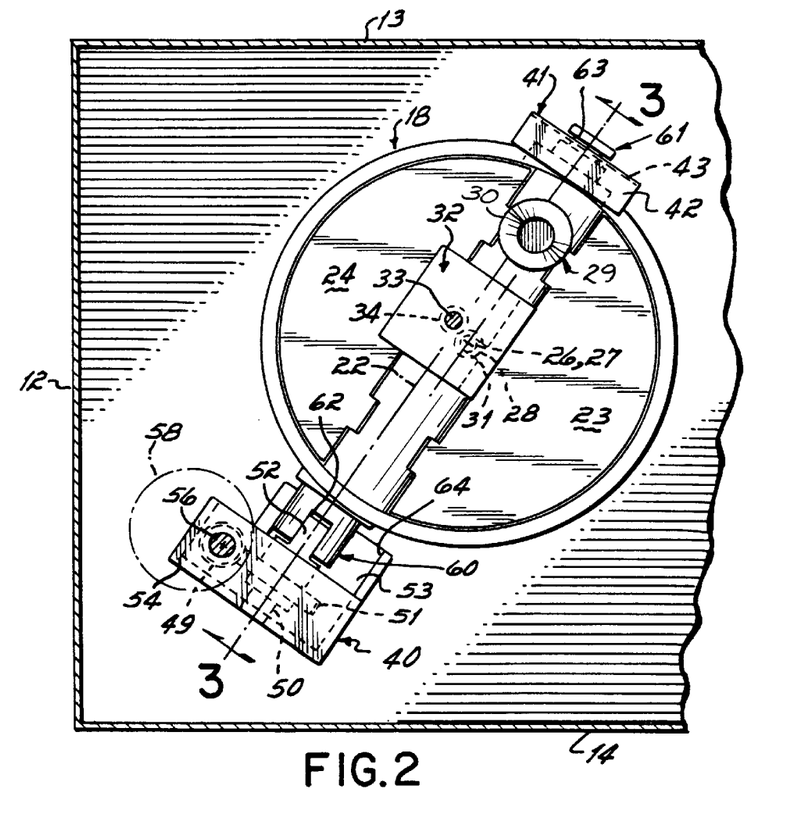
FIG. 2 is a cross-sectional view of a popcorn popping kettle as seen on line 2—2 of FIG. 1.

The popping kettle 18 is of any suitable variety having a heater (not shown in FIG. 1) interconnected by a control line 19 to a power plug 20 mounted inside on the top 21 of the cabinet. It will be appreciated that the kettle 18 is tiltable about a tilt axis 22 (FIG. 2) and is provided with covers 23 and 24 which are pivoted on the kettle 18. When the corn is popped, it pushes these covers open and falls out the sides of the kettle onto platform 17. Moreover, it will be appreciated that the cover 23 is located over a so-called "dump section" or side of the kettle 18. When the kettle is tilted, this cover pivots open to facilitate dumping of popcorn onto platform 17.

Positioned between covers 23, 24 is an oil funnel 29 which has a flared funnel mouth 30. When the kettle 18 is upright as shown in FIG. 1, the funnel 29 aligns with an oil outlet 37 which is coupled via a delivery tube 39 to oil pump system 36. Oil is pumped up by system 36 to drain into funnel tube 29 and kettle 18 for use during a cooking cycle as discussed in greater detail hereinbelow.

Figure 3:
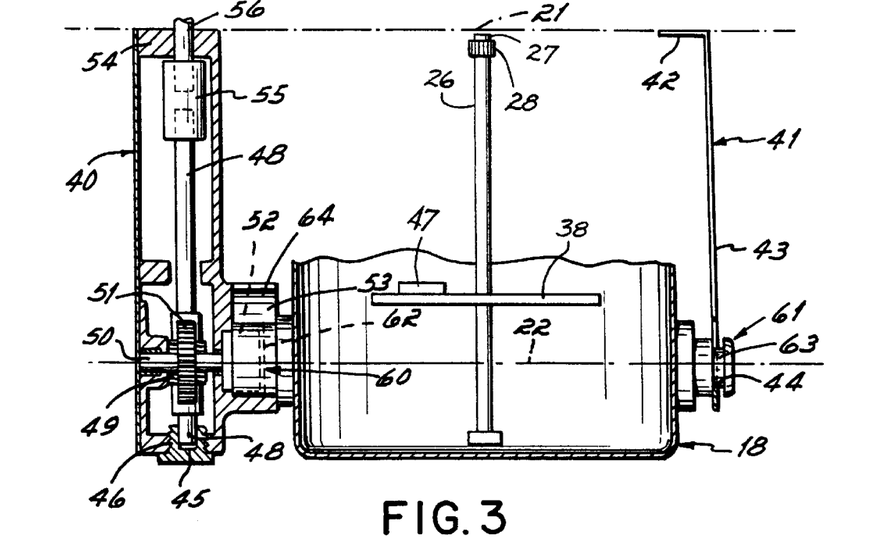
FIG. 3 is a cross-section taken along lines 3—3 of FIG. 2.
Figure 4:
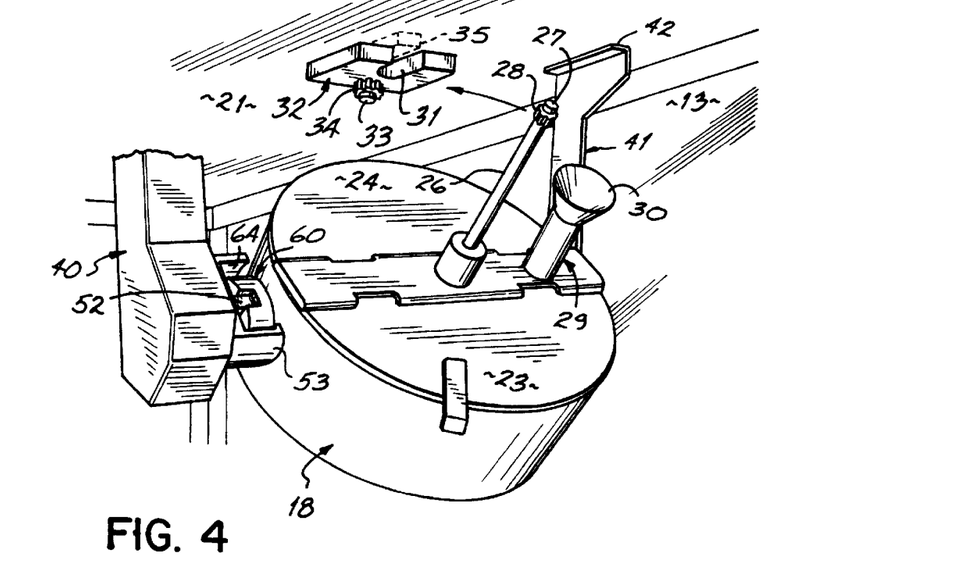
FIG. 4 is a perspective-view of the kettle of the popcorn popper of FIG. 1.

The kettle 18 includes an internal agitator, stir blade or rotor 38 (FIG. 3) driven by a rotor drive shaft 26 having an upper pilot end 27 and a driven gear 28 thereon. Referring to FIG. 4, when the kettle is in a cooking position as shown in FIG. 1, the upper pilot end 27 of the rotor drive shaft 26 is located in a socket 31 defined in a rotor drive housing 32 adjacent a drive shaft 33 and a drive gear 34. The drive gear 34 intermeshes with the driven gear 28 on the upper pilot end 27 of the rotor drive shaft 26 to drive the rotor within the kettle to promote popping. Directly above socket 31 in drive housing 32 is a position sensor 35 which determines that shaft 26 is seated in socket 31 and kettle 18 is in a cooking position. The sensor 35 promotes more accurate positioning of the kettle after it is tilted as discussed in greater detail below. The stir blade and shaft 26 are rotated by stir motor 68 which is activated by an appropriate operating switch on the panel 25 or by the controller of the invention as discussed below.

Referring again to FIG. 3, the blade 38 of the invention is weighted to prevent popcorn from being trapped against the blade during a dump cycle. As discussed further hereinbelow, the kettle 18 is tilted or dumped during a cycle to dump out the cooked popcorn. To prevent hindrance of the popcorn by blade 38, the blade is weighted on one side with an appropriate weight element 47 which causes the blade to rotate to a downward or generally vertical position during a kettle dump cycle. The blade 38 is then out of the way of the dumped popcorn so that popcorn falls freely from the kettle.

The kettle is mounted in the cabinet of the popper 10 by way of a drive housing 40 and a spring-like hanger bracket 41.

The spring-like hanger bracket 41 includes an L-shaped bracket having a foot 42 for interconnection to the top 21 of the cabinet. The depending flat spring leg 43 is provided with an aperture or slot 44, as will be further described.

Figure 1A:
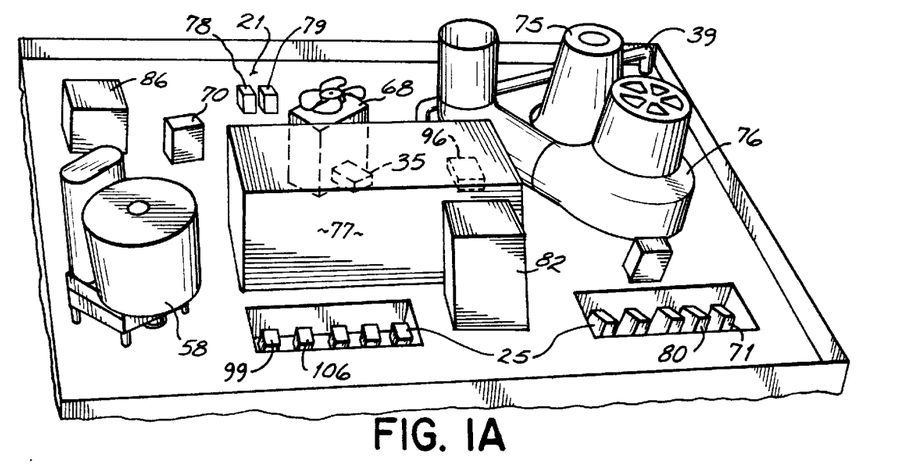
FIG. 1A is a perspective view of the top of the popcorn popper of FIG. 1.

On the other side of the kettle, the drive housing 40 houses the drive shaft 48, which is provided with a worm gear 49 on the bottom end thereof. A drive stub shaft 50 is provided with a gear 51 for intermeshing with the worm gear 49. The opposite end of the drive stub shaft 50 is provided with a drive stub 52 disposed in a socket 53 of the drive housing 40. The upper end of the drive housing 40 is provided with a mounting foot 54 for securing the drive housing 40 to the top 21 of the cabinet of the popper 10. In addition, it will be appreciated that the drive shaft 48 can be a one-piece drive shaft or it can be coupled through a coupling 55 to the depending drive shaft 56 of a dump motor 58 (FIGS. 1 and 1A). Drive shaft 48 is journaled in a blind bore 45 located in an externally threaded bushing 46 in the bottom of housing 40 (FIG. 3). This prevents lubricants from leaking into the popped pop corn.

The kettle 18 is provided with a drive boss 60 and a hanger boss 61. The drive boss 60 is provided with a slot 62 for receiving the drive stub 52, supported by the drive housing 40. The hanger boss 61 extends from the other side of the kettle with respect to the drive boss 60 and is provided with a groove 63 for receiving the depending leg 43 of the hanger bracket 41. In this regard, the groove 63 fits within a slot or aperture 44 of the hanger bracket 41 so that the kettle can be rotated about the pivot axis 22. At the other drive side of the kettle, the drive boss 60 resides in the socket 53, defined by the drive housing 40, so that the drive boss 60 can rotate in that socket. It will be appreciated that the socket has an opening 64 for accommodating radial movement of the drive boss 60 with respect to the socket and to the drive stub 52 when the drive stub 52 and the recess 62 in the drive boss 60 are aligned with the opening 64 to permit the drive boss to be moved outwardly of the socket.

Alternatively, the kettle could be supported in a cantilevered fashion only by the drive boss or other supporting apparatus as will be appreciated.

Turning now momentarily to FIG. 1A, there is shown a perspective view of the top of the popper 10 showing various components of the popper mounted outside the cabinet on the top 21 thereof including parts of the kettle operating system. The kettle operating system as it is termed herein includes the kettle heaters (not shown) and the kettle dump motor 58 as well as the control components which operate the popper in accordance with the principles of the invention.

As shown in FIG. 1A, the dump motor 58 is mounted on the top 21, such that drive shaft 56 extends downwardly through the top 21 and into the drive housing 40 (FIG. 3). A rotor drive motor or stir motor 68 is also positioned on the top 21 so that its drive shaft 33 extends downwardly through the top 21 and through the housing 32 for interconnection with the drive gear 34. A buzzer 70 is positioned preferably on the top 21 as shown, as well as a cabinet light 75, a ventilator 76 and various support circuitry for the components, including a Programmable Logic Controller (PLC) 77, a temperature controller 82, and a solid state relay 86 to the kettle heaters.

The control components for the control system of the invention comprise a Programmable Logic Controller, or PLC, such as a PLC made by Omron Electronics, Inc., One East Commerce Drive, Schaumburg, Ill. 60173, under the Model No. C20R. PLC 77 is connected to dump motor 58 through an UP relay 78 and a DOWN relay 79. The PLC is also connected to the audible buzzer 70 and to light 71 for audibly and visually notifying an operator when the kettle 18 is ready to receive another batch of popcorn, oil, salt and other ingredients. The visual indicator light 71, which may be positioned on control panel 25, flashes to visually alert an operator that the kettle is ready for another batch of ingredients simultaneous with the buzzing of buzzer 70. The visual indicator light 71 will provide a visual indication to an operator and is particularly helpful in the case of multiple machines in an area where it may be difficult to determine which one is buzzing. The PLC 77 provides output signals to the dump motor relays 78 and 79 to tilt the kettle and dump the popcorn cooked therein at the cessation of a cooking cycle. Output signals from the PLC 77 to the buzzer 70 and light 71 produce an audible signal and a visual signal which ensure consecutive batches of fresh popcorn without delays between batches as are normally associated with conventional popcorn machines.

The present invention is operable to monitor the temperature of the kettle to automatically alert the operator to load ingredients to automatically begin a cooking cycle when ingredients are loaded, and to end the cooking cycle and automatically initiate a dump cycle to empty the popcorn and again alert the operator to load more ingredients for the next batch. The invention monitors the kettle temperature and determines at certain temperature checkpoints which operations are to be automatically executed. Therefore, the popper of the invention may be loaded with corn and/or oil and then ignored until the next ingredients load to free the operator to handle other tasks. To that end, the control system of the invention further comprises a temperature controller 82 to control the heating of kettle 18 and to provide input signals to the PLC 77 for initiating a popcorn cooking cycle and subsequently for controlling dump motor 58 to dump finished popcorn from the kettle after a cooking cycle is complete. The temperature controller 82 has an output line 84 which is operably coupled to a solid state relay 86 connected to kettle heater 88. To provide a temperature input to the PLC, a thermocouple 90 is operatively connected to kettle 18 close to kettle heater 88 to monitor the temperature of the kettle. An output signal on line 92 from the thermocouple is input into the temperature controller 82. Through thermocouple 90 and line 92, the temperature controller 82 monitors the temperature of kettle 18 and turns power to the heater 88 ON and OFF through solid state relay 86 to maintain the temperature at a predetermined start temperature or equilibrium temperature. Preferably, the start temperature is approximately 500° F. to 525° F., although it will be appreciated by one of ordinary skill in the art that such a temperature might be varied up or down for a particular size kettle or other variable cooking conditions.

The temperature controller 82 communicates on line 94 directly with the PLC 77. Line 94 is a low temperature alarm line which is utilized to set the beginning of the cooking cycle and to initiate a kettle dump at the end of the cooking cycle. As described further hereinbelow, temperature controller 82 sends an input signal on line 94 to the PLC 77 when thermocouple 90 indicates that the kettle temperature has dropped below a predetermined temperature or low alarm temperature, such as when uncooked popcorn kernels and oil are poured into the kettle 18, and through thermal loading, cause a rapid decrease in the kettle temperature. The falling temperature passing through the low alarm temperature point 149 indicates that a cooking cycle has been started (See FIG. 8). As may be appreciated, as the popcorn in kettle 18 cooks, the thermal load is reduced and the temperature of kettle 18 begins to rise again. The kettle temperature will again pass through the low alarm 150 temperature point, except this time as a rising temperature rather than a falling temperature, the rising temperature passing through the alarm point indicates the end of the cooking cycle (See FIG. 8). At such a time, a signal is sent on line 94 to the PLC 77 to initiate a kettle dump procedure to dump the cooked popcorn onto service platform 17 as discussed below. While the low alarm temperature may be variably adjusted in temperature controller 82, it is preferably set to be approximately 50° F. to 75° F. below the start temperature referenced above, e.g., it may be set to be approximately around 425°–500° F., depending upon the preferred start temperature. The temperature point indicating the temperature 149 as it first falls through the low alarm temperature when uncooked popcorn is added to the kettle is designated the cycle temperature or cycle point as it indicates to the PLC the beginning of an official cooking cycle. A cooking cycle is not begun until the kettle drops below the cycle temperature 149 to prevent false cycles which might occur as the empty kettle fluctuates around the start temperature (see FIG. 8). That is, the substantial drop from the start temperature will indicate that corn and oil have been added to the kettle. The subsequent point 150 wherein the temperature increases back up to the low alarm temperature after the popcorn is cooked and popped is considered the dump point or dump temperature because the PLC initiates a kettle tilt to dump the popcorn at that temperature. Preferably, the cycle temperature 149 and 150 and dump temperature are approximately the same (see FIG. 8), e.g., approximately 475° F. However, it may be appreciated that the temperatures might also be offset from each other. Both the cycle temperature and dump temperature are below the start temperature point.

In order to ensure stable heating of kettle 18, the temperature controller 82 will preferably cycle solid state relay 86 and heater 88 ON and OFF numerous times as the kettle temperature closely approaches the equilibrium start temperature. This reduces substantial conditions beyond levels 142 and 152 of the kettle temperature which might occur should the heater be turned OFF only at the time that the kettle reaches the start temperature due to thermal transients in the system. A suitable temperature controller for use with the invention is the Model 935 Proportional Integral Derivative or PID, programmable temperature controller available from Watlow, 1241 Bundy Blvd., P.O. Box 5580, Winona, Minn. 55987-5580. The Model 935 temperature controller 82 is capable of monitoring when the kettle temperature is getting close to the equilibrium start temperature and operably slowing down the heating process as that start temperature is approached. The Model 935 temperature controller also has an alarm silence feature which prevents kettle dumping when the kettle is heating up upon initial powerup. For example, as discussed above, temperature controller 82 monitors a rising temperature which reaches the predetermined low alarm temperature in order to indicate the end of a cooking cycle and to control the dump motor 58 to dump the kettle. As may be appreciated, a rising temperature passing through the low alarm temperature is a scenario which will occur upon initial powerup as the kettle heats from a cold state to an equilibrium start temperature. In order to prevent a kettle dump at initial powerup, temperature controller 82 has a start override feature to ignore the first rising pass 151 through the predetermined low alarm temperature (See FIG. 8).

As the temperature controller 82 monitors the kettle temperature, it controls the operation of the heater 88 through solid state relay 86. The present invention alerts an operator when the kettle is ready to cook, and to indicate to the PLC 77 when kettle temperature has reached the equilibrium start temperature, a slave relay 96 is coupled to the output of relay 86 and provides an input to the PLC 77 on line 93. When the solid state relay 86 is closed to provide power to the heaters 88 to heat kettle 18, a 24V signal is delivered to PLC 77 through slave relay 96. When the solid state relay 86 closes and turns power to heater 88 OFF and remains OFF, indicating that the kettle has reached start temperature, (e.g., 525° F.) the slave relay 96 stops the signal to the PLC 77 and the PLC, in response, provides an output to buzzer 70 and light 71 to produce an audible and visual indication and alert the operator that the kettle is ready to cook popcorn. With consecutive batches of popcorn, buzzer 70 and light 71 will again be energized to provide an audible and visual indication indicating that the popcorn has been cooked and dumped and the kettle is ready for another batch of popcorn kernels. In that way, consecutive batches are made without delay.

The PLC 77 is also coupled to the kettle heat switch 80 to monitor when the kettle heat to popcorn popper 10 is turned ON and OFF. When power to the kettle heater 88 is turned OFF, the PLC 77 will internally reset a status bit. Thus, the PLC is not fooled into initiating a kettle dump when the power is turned OFF and then ON again, and in that way, the PLC 77 further prevents inadvertent dumping. For example, when the power and the heat to the kettle are turned ON by turning on switch 80 to deliver power to relay 86, the PLC 77 monitors the kettle temperature through temperature controller 82. If the heat 80 is then turned OFF, kettle temperature would drop, simulating thermal loading of the kettle with fresh popcorn and oil when indeed no popcorn or oil is loaded. If the kettle heat is then again turned ON, the PLC 77 may note the rising temperature passing through the low alarm temperature point and thus may believe that a batch of popcorn has been cooked and that it is time to dump the kettle. By resetting the PLC 77 status bit upon an interruption of power to the heater 88, such a scenario is avoided. A high limit switch 98 is coupled to the kettle heater 88 to cut off the power to the heater if the kettle temperature exceeds a set upper limit, such as if the solid state relay 86 stays open or the temperature controller malfunctions.

The stir motor 68 turns a blade (not shown) during the cooking of the popcorn. In one version of the invention, stir motor 68 is turned on by a switch at the operating panel 25 and stays on. Alternatively, power to the stir motor is routed through PLC 77 and is controlled by PLC 77 as noted by line 73. PLC 77 operates the stir motor 68 so that the blade stirs automatically only during a cooking cycle and stops when the cooling cycle is complete independent of operator attention.

The oil for cooking the popcorn may be delivered either by hand, by the operator actuating a switch on the operating panel 25 which is coupled to pump system 36, or alternatively may be handled automatically through PLC 77 to automatically deliver oil at the initiation of a cooking cycle. Oil pump system 36 preferably includes a reservoir 101, a control housing 103, and a pump 104 to pump oil from the reservoir. The pump system 36 will also usually include a heater (not shown) for heating congealed oil to a liquid state before pumping. The heater may be operably coupled to the control panel so that the oil may be properly heated for being pumped to kettle 18.

In one embodiment of the invention, the oil pump 104 is operably coupled to an oil pump switch 106 which is located at the operating panel 25. When the kettle heat switch 80 is ON and the kettle heats to the start temperature, oil will be needed for a cooking cycle. In accordance with the principles of the invention, oil pump switch 106 will be effectively disabled until all conditions are proper for a cooking cycle. Switch 106 is operably coupled to PLC 77 as indicated by line 111 and the PLC 77 is operably coupled to oil pump 104 as indicated by line 113. PLC 77 disables switch 106 until the kettle heat switch 80 is ON, as indicated by control line 115 between switch 80 and PLC 77, until kettle 18 is upright, as indicated by proximity switch 35 coupled to PLC 77, and until kettle 18 is properly heated as indicated by the thermocouple 90 and controller 82. This prevents oil from being pumped to funnel 29 from reservoir 101 until the kettle is hot and in the proper position.

Upon enablement of the oil pump switch 106, the operator may engage the switch to deliver a premeasured amount of oil from reservoir 101. Generally, pump 104 will be controlled by a timer 129 (see FIG. 6) which may be adjusted by a mechanically adjusted dial 117. In that way, the pump 104 will pump oil to kettle 18 for a predetermined amount of time to deliver the proper premeasured amount of oil. When the timer 129 times out, the pump 104 stops. Upon delivery of the oil, PLC 77 will disable switch 106 so that no more oil may be added until the next cooking cycle. In that way excess, uncooked oil is generally not present in the kettle, thus preventing any spills or messes. Pump 104 is coupled to line 39 for oil delivery.

Figure 1B:
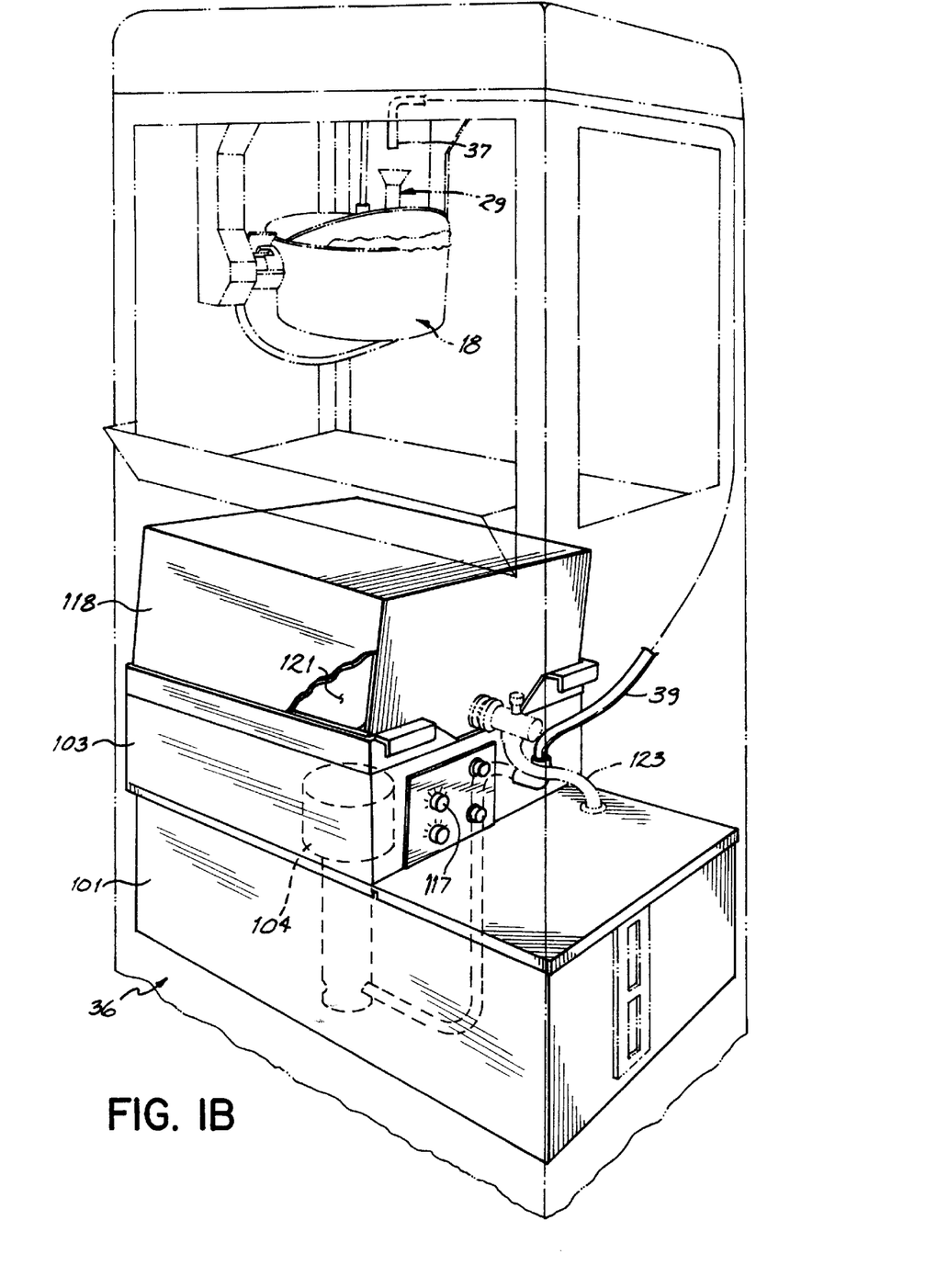
FIG. 1B is perspective view of the popcorn popper of FIG. 1 illustrating the oil pump system.

FIG. 1B illustrates the oil pumping system which is the subject of U.S. patent application Ser. No. 08/541,469 and greater detail about the operation of the system is given therein.

Pump system 36 is usually referred to as a bag-in-box system and includes a container 118 on top of control housing 103 which holds a flexible bag of oil 121. An oil tube 123 connects bag 121 and reservoir 101. Alternatively, an oil bucket or pail system, such as the Model 2114 Accumeter Bucket Pump (not shown) may be used.

In an alternative embodiment of the invention, the PLC 77 is operably coupled to pump 104 and timer 129 by control lines 131, so that delivery of oil is automatic. When the kettle 18 heats up, and is in the proper upright position as discussed hereinabove, the PLC 77 will automatically actuate pump 104, instead of enabling switch 106 and requiring the operator to actuate the switch 106. Therefore, oil is delivered automatically at the beginning of a cooking cycle. The operator then only has to add popcorn kernels, as the cooking cycle begins. Timer 129 will control how long pump 104 runs once it is actuated to deliver the proper amount of oil. Timer 129 may be a programmable timer which is set by the PLC 77 control lines 131 and may be programmed for certain, preselected amounts of oil for a batch. That is, the PLC 77 controls the timer 129 as opposed to a mechanical mechanism such as dial 117. Once the timer 129 times out, pump 104 stops and will not be reactuated until the next cooking cycle. As with the previous scenario, if the kettle heat switch 80 is OFF, no oil is added to the kettle.

It will be understood that various combinations of oil loading steps might be utilized in accordance with the principles of the invention. For example, the oil pump 104 may require switch actuation while the timer 129 is automatically programmed by PLC 77. In another version, the pump 104 may be automatically actuated by PLC 77 while timer 129 is manually set by a dial 117 or other mechanical device. The oil system 36 will generally include a preheater (not shown) for liquefying the oil prior to pumping. The preheater may be actuated at the control panel 25 or directly at the control housing 103 of oil system 36.

As the popcorn and oil are cooked during the cooking cycle and the kettle temperature begins to rise, it rises through the low alarm temperature 150 point or dump point as discussed above. A kettle temperature rise through the low alarm point or dump point which was preceded by a cycle point indicates the end of a cooking cycle and the invention is then operable to initiate a dump cycle. At the initiation of the dump cycle, the PLC 77 actuates the DOWN relay 79 to direct the dump motor 58 to rotate the kettle downwardly and thus dump the contents. The down relay is actuated for a predetermined period of time and then the relay is deactuated. Assuming that the cooking position of the kettle as illustrated in FIG. 1 is 0°, the kettle is rotated approximately 180° for the first dump to dump the popcorn contents therefrom. That is, the kettle is turned upside down. Subsequently, the PLC 77 actuates the UP relay 78 to energize dump motor 58 and move the kettle 18 toward the cooking position. However, the UP relay is only actuated to return the kettle partially to its cooking position and in fact is preferably energized for a time period sufficient to move the kettle to an approximately 60° angle between the 0° cooking position and the dump 180° position. This partial return is obvious to the operator and prevents him from believing the kettle is in the cooking position. Therefore, the operator is not misled into prematurely loading popcorn and oil into the kettle.

After the partial return toward the cooking position, the DOWN relay 79 is again actuated to make the dump motor 58 rotate the kettle downwardly to 180° to again dump the popcorn contents. The two-stage dump cycle of the present invention provides proper and complete dumping of all the contents from kettle 18 so that little or no popcorn remains in the kettle to be burned during the next cooking cycle. After the second dump, the UP relay 78 is actuated to energize dump motor 58 to return the kettle to the upright cooking position. Thus, the kettle 18 is rotated to a full dump position, partially returned, rotated to a full dump position again, and then fully returned to the cooking position for another cooking cycle.

Referring again to FIG. 4, when kettle 18 is returned to the cooking position, the upper pilot end 27 of drive shaft 26 engages socket 31, and in doing so will actuate the proximity switch 35. Proximity switch 35 is preferably a metal detecting proximity switch which indicates the presence of the shaft end 27. Upon sensing the shaft end 27, the proximity switch 35 provides an input to PLC 77 which then simultaneously actuates both the UP and DOWN relays 78, 79 to lock the dump motor 58 and provide a secure stop when the kettle is returned to the cooking cycle. Proximity switch 35 provides secure placement of the kettle in the cooking position and allows rapid return of the kettle to that position without slowing the motor down as the kettle approaches.

The present invention thereby prevents overshoot of the shaft end 27 and socket 31 and also ensures that the gears 28 and 34 are properly seated for the next cooking cycle. The proximity switch also ensures that oil can be added to the kettle 18 only when the kettle is upright.

Upon the return of the kettle 18 to the cooking position with the kettle heated back up to the start position, PLC 77 again actuates buzzer 70 to provide an audible indication to the operator that another batch of ingredients should be added to the kettle. In that way, consecutive batches of popcorn are made with very little delay between the batches. Thus, the productivity of the operator and the popper 10 and the profitability of the entire operation, is increased. PLC 77 operates to actuate buzzer 70 at ten second intervals until new ingredients are loaded into the kettle 18. In that way, the operator cannot ignore the popper 10 of the invention as it will continue to alert him until another batch of ingredients is loaded. If the buzzer is ignored for ten minutes, it will begin to sound continuously.

Figure 5:
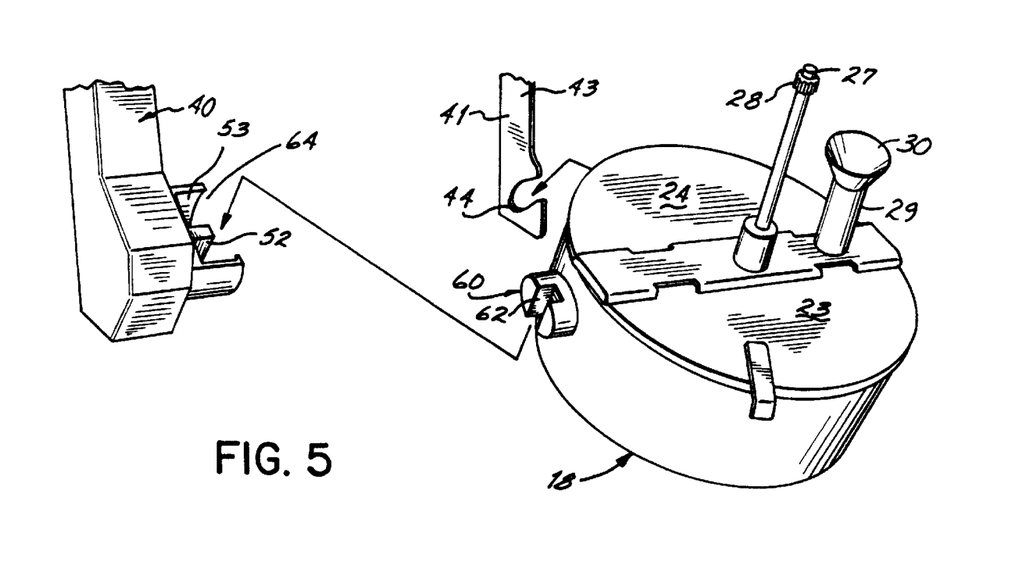
FIG. 5 is a perspective view of the kettle of FIG. 4 removed from its housing for cleaning.

Kettle 18 may also be removed and cleaned as described in the parent application entitled AUTOMATED CORN POPPER referenced above. To that end, the PLC 77 is operably coupled to a clean switch 99. When the clean switch is actuated, PLC 77 is operable to actuate the DOWN relay 79 and dump motor 58 to tilt the kettle 18 to a position between the cooking position and the full dumping position. In this intermediate position, the plane of the drive stub 52 is aligned with the opening 64 and the socket 53, thereby permitting the drive bar 60 of the kettle to be lifted out of the socket, cleaned, and then subsequently replaced for further popcorn cooking as illustrated in FIG. 5.

Figure 6:
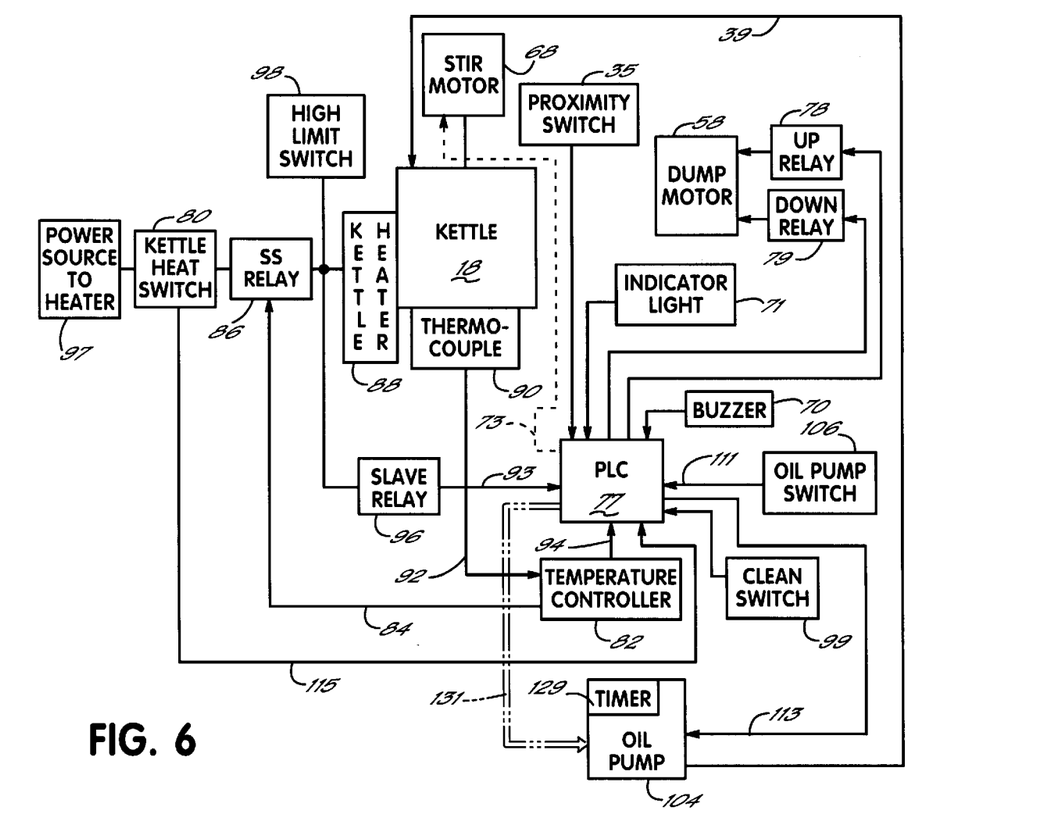
FIG. 6 is a diagrammatic view of the electrical components of the popcorn popper of FIG. 1.

Further understanding of the present invention may be obtained by a discussion of the operation of the invention and particularly to operation of PLC 77. An operational flowchart is illustrated in FIG. 6.

Prior to beginning a cooking cycle or in order to clean the kettle, the heat switch 80 should be OFF (block 95). The PLC 77 then checks to see if the kettle is cool (block 100). If the kettle is cool, the clean switch 99 is enabled by the PLC 77 (block 102). The clean switch may then be actuated to tilt the kettle 18 for cleaning. The kettle is then cleaned and returned to the upright position (block 127). As will be recognized, the kettle does not always have to be cleaned, and an operator may proceed directly to a cooking cycle wherein the process begins at block 105.

To begin a popping operation, the operator turns on the various systems of the popper. For example, the operator would turn ON the heat switch 80 to the kettle heater 88 to deliver power to kettle heater 88 through the relay 86. If necessary, the kettle stir motor 68 would be turned ON at panel 25 or may automatically be controlled by the PLC 77. The oil pump system 36 and any components, such as an oil preheater, might also be turned ON as indicated by block 105. When the kettle heat switch is ON, the PLC 77 monitors the kettle temperature through temperature controller 82 as indicated at block 107 in FIG. 7. As the PLC 77 monitors the temperature, it continuously checks to determine if the kettle temperature has risen to the low alarm temperature point which may indicate either that the kettle is initially heating up or is returning to its equilibrium start temperature after having cooked a batch of popcorn (see block 108). As indicated by line 109, the PLC 77 will continue to monitor the kettle temperature until it has risen to the low alarm temperature point. When it has reached the low alarm point, as indicated by line 110, the PLC 77 determines whether the system is initially being powered up and has not yet cooked the first batch of popcorn (see block 112). As discussed hereinabove, the temperature controller has a start override feature which ignores the first rising temperature pass through the low alarm temperature which indicates that the system is initially being powered up. By ignoring the first low alarm temperature point, the dump cycle is not initiated as indicated by block 114. Otherwise, when the rising temperature returns to and passes through the low alarm temperature point, a dump cycle would normally be initiated according to block 116 because a low alarm temperature point preceded by another low alarm point (cycle point) will indicate the end of a cooking cycle and a dump point as described above.

Figure 7:
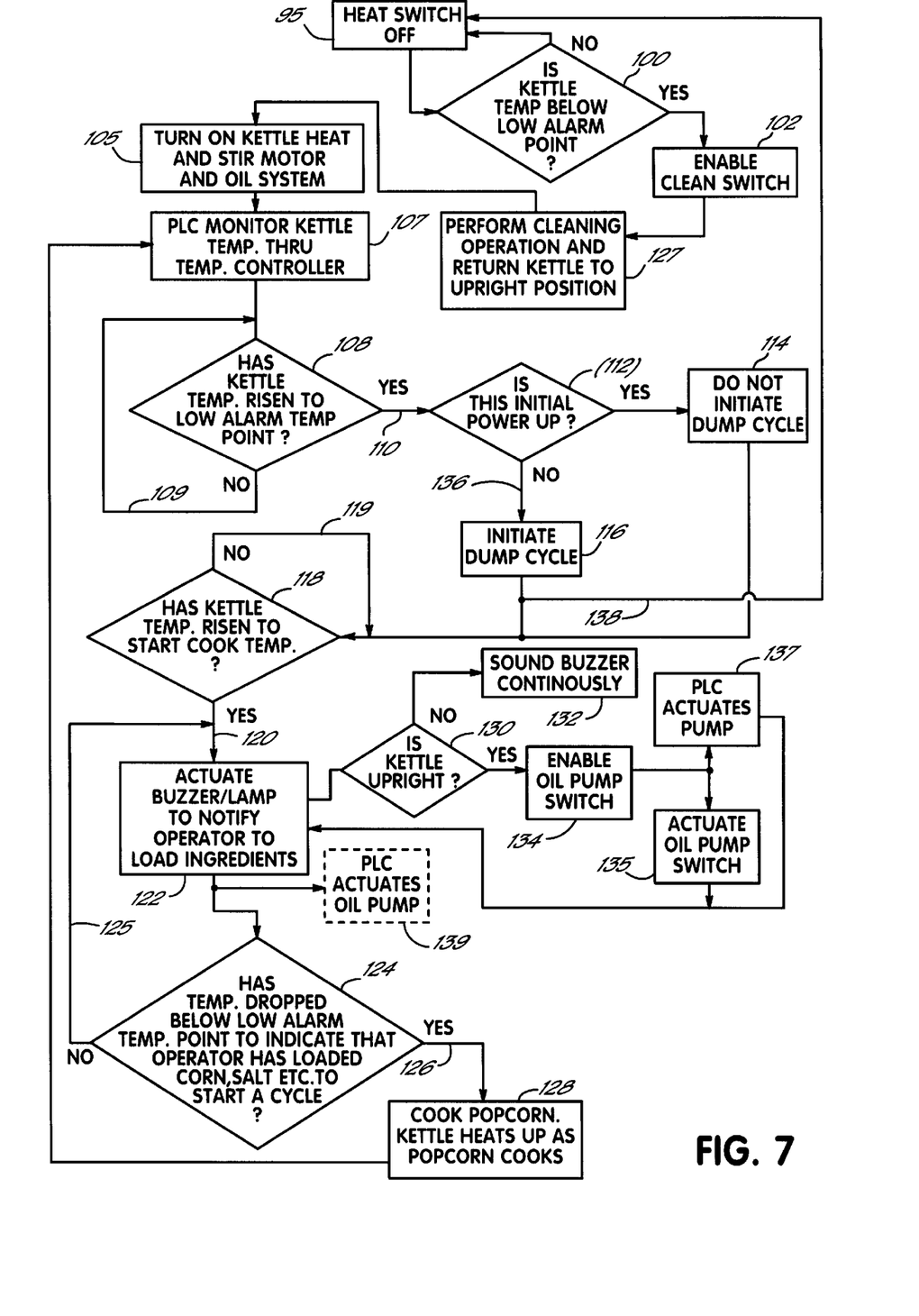
FIG. 7 is an operation flowchart of the popcorn popper apparatus of the invention; and, FIG. 8 is a temperature graph versus time of the kettle during a popcorn cooking cycle.

As the PLC 77 and temperature controller monitor the kettle temperature, the PLC 77 checks to see if the kettle temperature has risen to the equilibrium start temperature which is preferably approximately 500° F. to 525° F., as indicated by block 118. If the kettle temperature has not reached the start temperature, the PLC 77 continues to monitor the kettle until that temperature is reached according to line 119. When the equilibrium start temperature has been reached, the system indicates that the kettle is ready to be loaded with ingredients to cook a batch of popcorn (line 120). At the start temperature, a buzzer is sounded and a light flashed intermittently by the PLC 77 to notify the operator that it is time to load popcorn ingredients and to start cooking according to block 122. The buzzer will sound intermittently at ten second intervals and will continue to sound for ten minutes. If the operator ignores the buzzer for ten minutes, and no ingredients have been loaded, the buzzer will then sound continuously.

When the kettle is ready to cook, the PLC 77 checks to see if the kettle is upright (block 130). If not, the buzzer sounds continuously (block 132). If the kettle is upright, the oil pump switch 106 is enabled (block 134). At this point, the oil pump switch 106 may be manually actuated to add a premeasured amount of oil to the kettle as described above (block 135). After oil is added, the switch 106 will be disabled as discussed above, so that no more oil may be added until the next cooking cycle. Alternatively, the PLC 77 may automatically actuate the oil pump system (block 137) as described above. At that point, popcorn is also added to initiate a cooking cycle. As may be appreciated, the automatic pumping of oil may be prevented until after the popcorn is loaded and a cooking cycle is initiated, as shown by block 139. In that way, oil introduction is not premature, such as when the kettle heat switch is turned OFF while the buzzer is sounding and light flashing to clean the kettle as discussed above. For example, oil might not be automatically added until after the temperature of the kettle full of popcorn drops, indicating the initiation of a cooking cycle.

The PLC 77 then monitors the kettle temperature in order to determine if the ingredients have been loaded. As discussed above, the uncooked ingredients such as corn and oil will act as a heat load and reduce the kettle temperature when they have been placed therein. As noted in block 124, the PLC 77 will continue to monitor the kettle temperature and if no ingredients have been loaded, i.e., kettle temperature has not dropped (line 125), the buzzer will continue to sound. If ingredients are loaded, the kettle temperature will drop somewhat rapidly and will plunge below the low alarm temperature point (cycle point) 149 of the temperature controller (see FIG. 8). The buzzer then stops buzzing and the light stops flashing. Popcorn is then cooked by the kettle (block 128).

As the buzzer 70 is sounding and light flashing 71, the operator has the alternative options of turning the machine off or loading ingredients. If the kettle heat switch 80 is turned OFF, the system operation essentially returns to block 95 to determine if it is safe to clean the kettle.

Returning now to block 128, as the popcorn is cooked, the kettle begins to again heat up and the temperature controller 82 and the PLC 77 continue monitoring the kettle temperature to determine if it has recovered or risen back up to the low alarm temperature point (dump point) 150 and proceeded through that point on its way back to an equilibrium start temperature (block 108). If the kettle temperature has risen to the dump point and it is not an initial power-up situation, as indicated by line 136, a dump cycle will be initiated as described hereinabove (block 116). After the dump cycle is initiated, the system either returns to block 95 if the kettle heat switch is turned OFF to clean the kettle (line 138) or will continue to heat the kettle up to its equilibrium start temperature and will be ready for the next load of ingredients to cook the next batch of popcorn. As illustrated by block 118 when the start temperature has again been reached, the buzzer will again sound to notify the operator to load ingredients. Also, the oil pump switch will be enabled (block 134), after having been disabled after oil was added for the previous batch.

In that way, the automated corn popper 10 of the present invention only has to be loaded with ingredients to continually produce successive batches of popcorn. Once the ingredients are loaded, the operator can ignore the popper and the corn will be properly cooked and dumped to be ready for serving. An audible buzzer 70 and flashing light 71 will constantly remind the operator when a new ingredients load is need and a cooperative working relationship between the operator and the popper is developed for producing consecutive batches of fresh popcorn efficiently and safely while leaving the operator to more important tasks such as selling the product. Furthermore, the temperature control of the popper ensures that the right amount of heat is applied to each batch of popcorn for consistently cooked popcorn. Still further, the invention controls an oil pump system to ensure that the proper amount of oil is added without excess.

Figure 8:
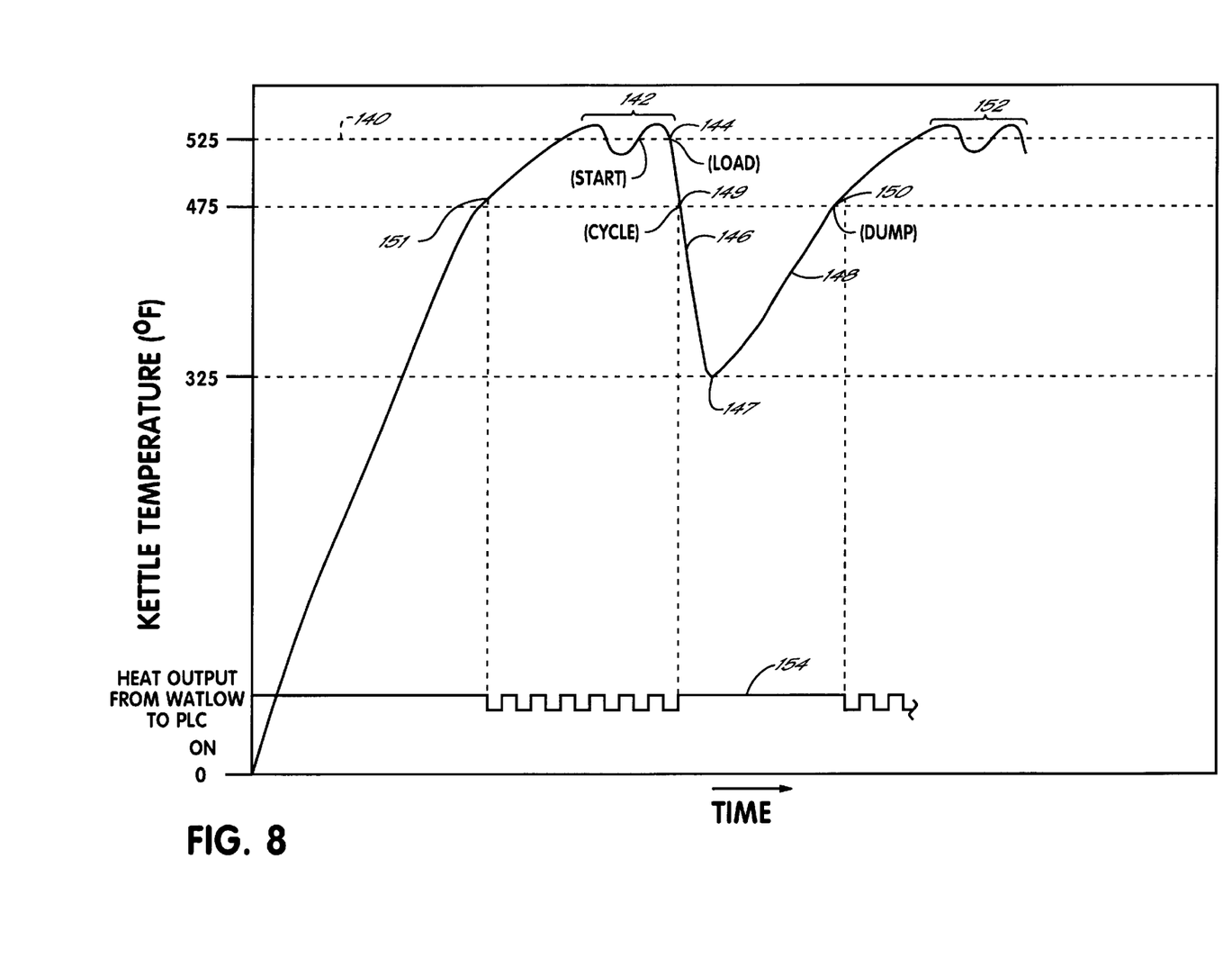

FIG. 8 schematically illustrates the kettle temperature as a function of time through initial power-up and a single cooking cycle. When the kettle heat is turned on, the kettle 18 heats up steadily until it reaches an equilibrium start temperature as indicated by line 140. Preferably, an equilibrium start temperature will be around 500° F. to 525° F., but may be adjusted accordingly, depending upon the popcorn load and the size of the kettle and other heating factors as understood by a person of ordinary skill in the art. The temperature controller 82 of the invention is programmed with the equilibrium start temperature and will automatically monitor the kettle temperature to determine when it begins to approach the start point 144. The temperature controller 82 will cycle the heater 88 accordingly to prevent a large amount of overshoot as indicated by the decreasing slope of the curve as it approaches line 140. When the start temperature is reached, the kettle heater 88 is cycled ON and OFF by relay 86 to maintain the kettle close to the start temperature as indicated in the curve section designated by reference numeral 142. When ingredients, such as kernels and oil, are loaded, as indicated by the load point 144, the kettle temperature drops off somewhat rapidly as indicated on the curve by reference numeral 146. Depending upon the popcorn and oil load, the kettle temperature would drop to a low point 147, for example in FIG. 8, indicated around 325° F. As the kettle temperature drops, it will drop through a low alarm point 149. This first low alarm point is designated the cycle point or cycle temperature, because the PLC 77 sees it as the beginning of a cooking cycle.

As the popcorn cooks, the kettle temperature again begins to rise as indicated by reference numeral 148 and will again pass through the low alarm set point or dump point 150. At dump point 150, the end of the cooking cycle is indicated, and the PLC 77 responds by initiating a dump cycle. Therefore, the cooking cycle is defined between the cycle point 149 and the dump point 150, although some cooking of the popcorn will occur before the cycle point 149 and after the dump point 150.

The dump cycle is a two-stage dump and empties the cooked popcorn onto the serving platform to be sold. After the dumping cycle, the kettle temperature again rises to the equilibrium start temperature of 525° F. and the heater will again be cycled ON and OFF to keep the kettle at that temperature indicated on the curve by reference numeral 152. At the start temperature, the buzzer 70 will again sound and the light 71 will flash to indicate to the operator that a batch of popcorn has just finished cooking and that a new load of ingredients should be added to the kettle.

Line 154 illustrates the signal on line 94 from temperature controller 82 to the PLC 77. When the low alarm temperature points are reached and exceeded (either cycle point or dump point) the output from the temperature control cycles oscillates from high to low at an internal frequency. The square wave signal is used preferably to drive the intermittent buzzer 70 and flashing light 71. When the temperature of the kettle drops below the low alarm temperature point, the output of temperature controller 82 stays high, which indicates that a cooking cycle is ongoing.

As described, the present invention continuously and properly cooks popcorn in consecutive batches with minimal attention by the operator. Because the kettle is controlled by temperature and the dump cycle is initiated automatically depending upon the kettle temperature, the popcorn is not burned and is not affected by operator inattention. Furthermore, the introduction of oil is controlled for a proper, premeasured amount only once during each cooking cycle. Messes and spills associated with the prior art devices are reduced, and a reduction in the delays between fresh batches of popcorn will increase the production rate of the popper and thereby increase sales and profitability of the popper. Furthermore, the present invention insures that a consistent and proper amount of heat energy is always applied to the corn for popping. The invention is not particularly susceptible to environment variations, and will ensure that the proper amount of heat energy is applied to a batch of corn. Larger batches will get more heat energy and small batches will get less heat energy to insure consistent popping.

The present invention also provides the proper amount of heat to maximize kernel expansion at popping. With the heat maintained at the proper level, the temperature of the corn and the steam pressure in the kernels will cooperate to provide consistent and high kernel expansion. With the present invention, popping expansion of rates of 1:50 have been achieved which are a significant improvement over the 1:44 or lower rates achieved by the prior art.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, applicant intends to be bound only by the claims appended hereto.

What is claimed is:

1. A method for popping popcorn comprising:

placing uncooked popcorn in a kettle;

heating the kettle for cooking and popping the uncooked popcorn placed therein and dumping the kettle for dispensing the popped popcorn;

monitoring a kettle temperature condition and selectively heating and dumping the kettle in response to said monitored kettle temperature condition;

said monitoring further comprising sensing a temperature drop in the kettle indicating loading of the kettle with uncooked popcorn after the kettle is heated and sensing a subsequent temperature rise in the kettle indicating that the popcorn is being popped;

dumping the popcorn when the kettle temperature subsequently rises and exceeds a predetermined dump temperature indicating that a portion of the popcorn is popped.

2. The method of claim 1 further comprising generating an indication with at least one of an audio and a visual device when the kettle is heated to a predetermined start temperature to alert an operator to load the kettle with unpopped popcorn.

3. The method of claim 1 wherein the kettle is tiltable and further comprising tilting the kettle in response to said temperature condition to dump the popcorn from the kettle after it has been popped.

4. The method of claim 1 further comprising initiating a cooking cycle when the kettle temperature drops when the uncooked popcorn is added and decreases below a predetermined cycle temperature.

5. The method of claim 4 wherein said cycle temperature is approximately equal to said dump temperature.

6. The method of claim 1 further comprising delivering an amount of cooking oil to the kettle in response to said monitored kettle temperature condition.

7. The method of claim 6 further comprising preventing the delivery of any additional oil to the kettle after said amount is delivered until after the kettle is dumped.

8. The method of claim 1 further comprising pumping oil to the kettle with an oil pump system and disabling the oil pump system in response to said monitored kettle temperature condition.

9. The method of claim 6 further comprising automatically pumping oil to the kettle from an oil pump system in response to said monitored kettle temperature condition.

10. A method for popping popcorn comprising:

placing uncooked popcorn in a kettle;

heating the kettle for cooking and popping the uncooked popcorn placed therein and dumping the kettle for dispensing the popped popcorn;

monitoring a kettle temperature condition and selectively heating and dumping the kettle in response to said monitored kettle temperature condition;

the kettle being movable between an upright position for cooking the popcorn and a dump position for dumping the popped popcorn, the method further comprising pumping oil to the kettle with an oil pump system and disabling the oil pump system when the kettle is not in an upright position.

11. A method for popping popcorn comprising:

heating a kettle for cooking and popping uncooked popcorn placed therein;

monitoring the temperature of the heated kettle;

generating an indication with at least one of an audio and a visual device when the kettle has been heated up to a predetermined start temperature to alert an operator to load the kettle with uncooked popcorn;

sensing a drop in kettle temperature indicating loading of the kettle with uncooked popcorn to be cooked and popped and sensing a subsequent rise in the kettle temperature indicating that the popcorn is being popped;

dumping the popcorn when a portion of the popcorn has been popped and the kettle temperature subsequently rises and exceeds a predetermined dump temperature.

12. The method of claim 11 wherein said predetermined start temperature is in the range of approximately 500° F. to 550° F.

13. The method of claim 11 further comprising sensing a drop in kettle temperature indicating loading of the kettle with uncooked popcorn to be cooked and popped; and, initiating a cooking cycle when the monitored kettle temperature decreases below a predetermined cycle temperature.

14. The method of claim 13 wherein said predetermined cycle temperature is in the range of approximately 425° F. to 500° F.

15. The method of claim 11 further comprising providing an audible indication in response to said kettle being heated.

16. The method of claim 11 further comprising providing a visual indication in response to said kettle being heated.

17. The method of claim 11 wherein said predetermined dump temperature is in the range of approximately 425° F. to 500° F.

* * * * *